United States Patent [19]

Du Bois

[11] 3,857,763

[45] Dec. 31, 1974

[54] RECOVERY OF ELECTROLYTIC DEPOSITS OF RHODIUM

[75] Inventor: Donald W. Du Bois, Corpus Christi, Tex.

[73] Assignee: PPG Industries, Inc., Pittsburgh, Pa.

[22] Filed: Nov. 24, 1972

[21] Appl. No.: 309,047

[52] U.S. Cl.................. 204/10, 204/47, 204/105 R, 204/109, 204/281
[51] Int. Cl. ....... C22d 5/00, C23b 5/24, C22d 1/12
[58] Field of Search............ 204/10, 105 R, 109, 47, 204/281

[56] References Cited
UNITED STATES PATENTS

| | | | |
|---|---|---|---|
| 2,761,757 | 9/1956 | Kamen et al................ | 204/105 R X |
| 2,773,820 | 12/1956 | Boyer et al.................. | 204/105 R X |
| 2,776,184 | 1/1957 | Kamen........................ | 204/105 R X |

*Primary Examiner*—John H. Mack
*Assistant Examiner*—D. R. Valentine
*Attorney, Agent, or Firm*—Irwin M. Stein

[57] ABSTRACT

An acidic, rhodium-containing solution is electrolyzed in an electrolytic cell and rhodium therein deposited on a cathode, e.g., a titanium cathode. The rhodium metal deposit is removed from the cathode by contacting the cathode with dilute hydrofluoric acid. Solid rhodium metal is removed from the electrolytic cell and, if desired, purified.

13 Claims, No Drawings

3,857,763

RECOVERY OF ELECTROLYTIC DEPOSITS OF RHODIUM

DESCRIPTION

Rhodium is produced during neutron-bombardment of uranium-containing fuel elements which are used in nuclear reactors. During processing of such nuclear fuel elements, rhodium and other fission products are separated from the uranium fuel. It has been estimated that by 1975 the annual production of rhodium by nuclear fission reactors in the United States will be valued at $1,550,000. The uses for rhodium are many. For example, it is used as an alloy with platinum for high temperature thermocouples, as an electrical contact material, as a catalyst, for jewelry and for optical instrument mirrors.

One conventional method for processing nuclear fuel elements is known as the Purex process. This process is described in U.S. Pat. No. 2,990,240, issued June 27, 1961 in the name of Charles N. Ellison and Thomas C. Runion and entitled PROCESS FOR SEGREGATING URANIUM FROM PLUTONIUM AND FISSION PRODUCT CONTAMINATION. A waste stream produced by the Purex process is an aqueous alkaline solution of fission products. This aqueous alkaline solution contains fission products at a parts per million concentration. However, because of the large volume of aqueous waste produced, the amount of fission products present in these wastes is significant. It has been estimated that by 1980 more rhodium per year will be made by the nuclear industry than will be consumed in the United States.

A method proposed for separating rhodium from other fission products that are found in the waste streams produced from nuclear fuel processing is to precipitate rhodium therefrom as the sulfide and then convert the rhodium sulfide to a base-soluble complex rhodium salt. The pH of the resulting solution is adjusted to the alkaline range to remove base-insoluble constituents. After filtration, the filtrate is converted to the chloride and volatile fission products removed by distillation. The insoluble rhodium chloride is washed with an acid, such as aqua regia, and reduced in hydrogen to rhodium metal. See, for example, U.S. Pat. No. 3,166,404 and the corresponding British Patent Specifications 941,985 and 941,986.

A process for separating and recovering rhodium and other fission products from aqueous alkaline waste solutions of fission products is described in co-assigned U.S. application for Letters Patent Ser. No. 309,015, filed contemporaneously herewith, in the names of William W. Carlin and William Bruce Darlington and entitled RECOVERY OF FISSION PRODUCTS FROM WASTE SOLUTIONS THEREOF. Briefly, the process described in said application comprises extracting fission products, e.g., palladium, rhodium and technetium, values from the aqueous alkaline waste solution by anion exchange techniques. The metals thus absorbed are eluted from the ion exchange resin and acidic solutions of each metal subjected to controlled cathodic potential electrolysis in an electrolytic cell. The metal deposited on the cathode is recovered and, if desired, further refined by redissolving the metal and repeating the aforementioned electrodeposition technique.

In the case of some fission products, such as palladium, the metal deposit on the cathode can be removed easily by dissolving it from the cathode with an acid. However, in the case of rhodium, this technique has not been found entirely adequate. Rhodium is insoluble in most acids and is practically so in aqua regia. Thus, the use of acid to strip rhodium from the cathode generally causes dissolution of a layer of the cathode below the rhodium deposit, thereby shortening the useful life of the cathode. Mechanical removal of the rhodium deposit can remove a significant portion of the cathode and is more difficult, especially when the rhodium deposit is radioactive. A more suitable rhodium removal technique was, therefore, needed.

It has now been discovered that deposits of rhodium can be removed from the surface of an electrode without dissolving significantly a portion of the electrode by contacting such electrode with a dilute solution of hydrofluoric acid. It has been found that the hydrofluoric acid undermines the rhodium deposit and causes it to flake off the electrode. While some electrode attack occurs due to the use of an acid stripping agent, such attack is substantially minimized by using dilute hydrofluoric acid solutions, e.g., aqueous solution of from about 0.1 to about 5 weight percent hydrofluoric acid.

DETAILED DESCRIPTION

The present invention relates to the recovery of rhodium deposits from the surface of an electrode. In particular, this invention relates to the recovery of rhodium from aqueous solutions containing fission products including rhodium, e.g., from aged Purex alkaline waste solutions. While the present invention is applicable to the recovery of rodium from liquids containing same, regardless of the source thereof, the present invention is particularly applicable to the recovery of rhodium from aqueous waste solutions containing fission products obtained in processing neutron-irradiated uranium-containing fuel elements. For completeness, a method for recovering fission product metal values from aged alkaline Purex wastes (PWS) will be described briefly.

In accordance with one embodiment of the present invention, an aqueous alkaline solution of fission products, e.g., aged alkaline Purex wastes, is intimately contacted with anion removal material, e.g., an anion exchange resin, whereby metal values therein are adsorbed by the anion removal material. Palladium, rhodium and technetium are present usually in the PWS as anionic species and, therefore, are removed from the solution by the anion removal material. Cesium, ruthenium, strontium and cobalt are present typically in the PWS as cationic species and, therefore, significant amounts thereof are not adsorbed by the anion removal material. Typically, at least 95 percent of the radioactive ruthenium, cesium, strontium and cobalt in the PWS is not adsorbed by the anion removal material, thereby reducing significantly the radio-activity level of the adsorbate. The relative concentration of fission products in the aqueous alkaline waste stream is not critical since the ion exchange resin will adsorb anionic species up to its capacity, i.e., its breakthrough point. Further, the relative concentration of fission products in the waste stream will depend on the type of fuel element irradiated and reprocessed, e.g., uranium $^{235}$, uranium $^{233}$ and plutonium $^{239}$, the period of time the fuel element is in service and the specific fuel reprocessing method used.

The particular method of contacting the anion removal material with the PWS and the specific nature of the anion removal material are not critical to the practice of the present invention. Known adsorption (ion exchange) and elution (desorption) techniques utilized in connection with conventional ion exchange equipment can be used. In a preferred embodiment, the anion removal material is disposed as a bed in an elongated vertical column and PWS is passed through the column. Any suitable anion removal material can be employed in the present recovery process. Such anion removal materials are described in the aforesaid U.S. application Ser. No. 309,015, and that portion of the description is incorporated herein by reference. In brief, that description recites several anion removal materials, including the strong base quaternary amine type anion exchange materials, e.g., Amberlite-IRA-938 ion exchange resin, which is available from the Rohm & Haas Company, and Permutit SK ion exchange resin, which is available from the Permutit Co., as being useful.

Following the aforementioned adsorption step, the metal values adsorbed on the resin are removed therefrom and the resin regenerated in a desorption step. In the desorption step, the loaded anion exchange resin is customarily first washed with water, usually distilled water, followed typically by a washing with a weak solution of the eluting reagent, i.e., the elutriant. The effluents resulting from the separate preliminary washings are discarded, e.g., returned to the nuclear fuel processor together with the depleted PWS stream. After washing, the loaded anion exchange resin is regenerated by passing increasingly stronger solutions of the elutriant sequentially through the column. In this manner, metal anionic species adsorbed by the resin are substantially removed from it.

Among the elutriants that can be used in the present process, alone or in combination, there can be mentioned nitric acid, perchloric acid, sodium perchlorate, ammonium hydroxide, sodium hydroxide and ammonium thiocyanate. Nitric acid and sodium perchlorate are preferred elutriants.

The total volume of ion exchange regeneration liquor (eluate) from the desorption step is combined in a storage hold tank. The eluate, when nitric acid is used as the elutriant, is a nitric acid solution of approximately five molar. Although nitric acid is useful as an elutriant, it is not preferred as the electrolyte for the recovery of rhodium, palladium and technetium by controlled cathodic deposition. Substitution of the nitrate anion in the eluate can be accomplished by adding to the eluate a strong acid that has a high boiling point, i.e., significantly greater than the boiling point of nitric acid, and distilling off nitric acid from the eluate. It has been found that the electrolysis is improved when sulfate or perchlorate anion is present in the electrolyte. Therefore, in a preferred embodiment, the nitrate anion in the eluate is replaced with either sulfate or perchlorate anion by the addition to the eluate of the corresponding inorganic acid or a salt thereof, e.g., sulfuric acid or perchloric acid $HClO_4 \cdot 2H_2O$). Sulfuric acid is economically preferred.

Nitric acid and water are distilled from the eluate, leaving, for example, a sulfuric acid solution of the fission product values desorbed from the anion exchange resin. The nitric acid and water can be recycled for reuse in the desorption step. Generally, sulfuric acid is used in the distillation step because of its high boiling point.

The principal metal species present in the sulfuric acid solution following distillation of the water and nitric acid are technetium, ruthenium, palladium and rhodium. Technetium and ruthenium can be separated from palladium and rhodium by adding a strong oxidizing agent, such as perchloric acid, to the sulfuric acid solution and distilling the resulting solution in a manner such that the perchloric acid and volatile oxides of ruthenium and technetium are distilled leaving a bottoms product comprising a sulfuric acid solution containing palladium and rhodium. In the process described in copending U.S. application Ser. No. 309,015, the concentrated sulfuric acid solution is diluted with water and introduced into an electrolytic cell wherein palladium is selectively deposited at a controlled cathode potential. The depleted palladium solution is removed from the electrolytic cell and subjected to an electrolyzing current at a controlled cathode potential at which rhodium is deposited. This acidic solution may contain small amounts of palladium and minor amounts of other fission products.

As indicated, the rhodium-containing solution is typically acidic. The acidity thereof is not critical and can vary widely, e.g., from about 0.1 molar to about 10 to 12 molar. If the rhodium-containing solution is alkaline, it can be made acidic by adding thereto sufficient acid to establish an acid concentration within the aforementioned range. The presence of sulfate or perchlorate anion in the electrolyte is preferred; however, other anions, such as nitrate or phosphate, can be present in the electrolyte during electrolysis. The specific anion will depend, of course, on the source of the rhodium-containing solution. Sulfate anion is most preferred because of cost considerations.

The electrolytic cell wherein elemental rhodium is recovered by electrolysis can be any conventional electrolytic cell containing at least one fixed anode and cathode, as distinguished from electrolytic cells employing a flowing, e.g., mercury, cathode or anode. The cell housing should be constructed out of materials that are resistant to or inert to the electrolyte, as well as the gases discharged, if any, at the anode and cathode. Examples of materials of construction for the cell housing include: polyvinyl chloride, polyvinylidene chloride, glass, polytetrafluoroethylene, polyvinylidene fluoride and titanium. Typically, the cell housing contains stand pipes on the anode and cathode sides of the cell to remove any oxygen and hydrogen formed thereat respectively. Such gases are commonly passed through absolute filters before being vented to the atmosphere when the source of rhodium is a waste stream from processing nuclear fuel elements. Naturally, the cell housing is equipped with feed inlet and discharge lines. Preferably, the discharge line is located opposite the inlet port. While the electrolysis is preferably conducted at ambient or room temperatures, the cell can be equipped with a thermoregulator and heater to regulate the temperature of the electrolyte. While a single cell has been referred to, a plurality of cells in series or disposed in a single unitary housing or box can be used.

The anode of the electrolytic cell can be fabricated from any conventional electrode material resistant to attack by the electrolyte and substantially inert to gaseous oxygen which may be evolved thereat. Suitable anode materials include: noble metals, such as platinum, rhodium, iridium and platinum-iridium alloys, carbon (graphite); and valve metals, such as titanium, tantalum, zirconium, hafnium and titanium-clad copper having a coating of rhodium, platinum, ruthenium oxide or other noble metals or their oxides. By "valve metal" is meant a material which does not pass current when anodic but which does pass current when cathodic. Thus, any conventional electrode material which is compatible with the electrolyte and which resists being solubilized during electrolysis can be used as the anode in the electrolytic cell.

The cathode of the electrolytic cell can be fabricated from any conventional electrode material that is resistant to attack by the electrolyte, e.g., a sulfuric acid solution of rhodium, is substantially inert to gaseous hydrogen which may be evolved at the cathode, and which has a high hydrogen overvoltage. By "overvoltage" is meant the excess voltage above the theoretical voltage that is required to reduce the element, e.g., hydrogen, to its elemental state in the same electrolyte under the conditions stated. Suitable cathode materials include titanium, tantalum, zirconium, hafnium, titanium-clad copper or other valve metals. Titanium is especially useful as the cathode material.

In electrolyzing an acidic rhodium-containing solution in an electrolytic cell, the cathode and anode of the cell are connected to a source of direct current and an electrolyzing current is applied to the solution therein at a substantially constant cathode potential to thereby deposit metallic rhodium on the cathode. Electric power is fed to the cell in amounts sufficient to cause electrolysis of the electrolyte and cause deposition of the rhodium on the cathode.

The potential at which rhodium is selectively and controllably deposited upon the cathode can vary from about $-0.05$ to about $-0.5$ volts with reference to a standard silver/silver chloride reference electrode. Preferably, the cathode potential is controlled at from about $-0.2$ to about $-0.3$ volts with reference to a standard silver/silver chloride reference electrode. The upper limit of cathode potential, i.e., more negative than $-0.5$ volts, is not critical; however, a more negative voltage does not increase the rate of deposition and, since hydrogen is liberated starting at about $-0.3$ volts, it is preferred to maintain the cathodic potential at between $-0.2$ and $-0.3$ volts to thereby minimize hydrogen evolution. Completion of rhodium deposition can be ascertained by monitoring the cell current. After a period of slow current decay, the current plateaus at a very low level. When the cell current is negligible, electrolysis can be terminated.

Control of the cathode potential is achieved by utilizing a reference electrode in a salt bridge system. In such a system, the reference electrode is electrically connected to a potentiometer-controller, which operates to provide a signal to a rectifier controlling the power to the electrolytic cell. The reference electrode is also connected electrically to a sensing tip which is positioned close to the surface of the cell cathode. The reference electrode is usually positioned in a manner such that the sensing tip is approximately two millimeters from the working cathode. In this manner, a change in cathode potential occurring on the cathode surface is sensed by the tip of the reference electrode. That change causes a signal to be sent from the reference electrode to the controller-potentiometer which, in turn, signals the rectifier feeding power to the electrolytic cell, thereby causing an appropriate voltage adjustment, i.e., either an increase or a decrease. This control system can regulate the cathode potential to within ±0.01 volts. Because of the high conductivity of the electrolytes described herein, the use of low current densities, ambient temperatures and the reporting of potentials to 0.01 volts, correction for the voltage drop between the reference electrode tip and the working electrode surface is not generally necessary. The above-described equipment for controlling cathode potential is more aptly described in U.S. Pat. No. 3,562,123. Such description is incorporated herein by reference.

The size, configuration and number of cathodes in the electrolytic cell described are a function of the particular cathode design and are not critical to the present invention. The cathode should be designed in a manner so that sufficient cathode surface area is provided in the cell to plate substantially all of the rhodium present in the solution charged to the cell.

The surface area of the cathode in the electrolytic cell will depend upon the volume of electrolyte processed and on the percentage of metal recovery desired in a given period of time. Thus, for a given period of electrolysis, e.g., 24 hours, a certain percentage of rhodium will be deposited upon a cathode or cathodes of a given surface area. Generally, it is desirable that the thickness of the rhodium deposit on the cathode be relatively thin in order to permit removal of the metal relatively easily and to avoid dendritic growth. Typically, sufficient cathode surface area should be provided to accommodate a rhodium deposit of from 0.1 to 5 mils thick at 90 percent, preferably at least 95 percent, recovery and, more desirably, at least 99 percent recovery. The surface area of the anode or anodes should match or exceed that of the cathode(s) in order to achieve uniform deposition of the metal on the cathode(s).

Thus, in operating the electrolytic cell described herein at the indicated controlled cathode potential for rhodium, a cathode surface area sufficient to allow deposition of at least 90 percent, preferably at least 95 percent, and, more desirably, at least 99 percent, of the rhodium in the electrolyte subjected to electrolysis in a given period of time is used. For example, for a 100 milligram per liter concentration of rhodium, 99 percent thereof can be recovered in 20 hours with a cathode surface area of about 0.5 $ft^2$/gallon of electrolyte. The current density of the cell can range from about 0.1 to about 100 amperes per square foot of cathode surface. Since the electrolysis is performed at a constant cathode potential, the voltage of the cell will be an independent variable, and the current will be a dependent variable in the current-voltage relationship. The resistance of the cell is fixed initially by the character of the cell and electrolyte and will increase with time. As a consequence, the current will decrease with time. Such decrease is an indication of the depletion of rhodium being recovered from the electrolyte.

The operating variables of the above-described electrolytic cell which affect deposition time, i.e., the rate of deposition, of the rhodium being recovered are the stirring or circulation of the electrolyte and the ratio of total cathode surface area to electrolyte volume. A more rapid deposition rate is obtained by vigorous circulation with a given ratio of cathode surface area to electrolyte volume than with no circulation. The cathode area required is not a function of the concentration of the recoverable metal in the electrolyte but is a function of the electrolyte volume. The particular cell volume required depends, in the main, on the quantity of electrolyte to be processed. Calculations based on laboratory experience indicate that each gallon of electrolyte requires about 0.5 square feet of cathode area if a depletion of 99 percent in 20 hours is acceptable. To obtain a 99.9 percent depletion in 20 hours, a minimum cathode area of about 0.75 square feet per gallon of electrolyte will be necessary. Naturally, the longer the depletion time which is acceptable, the less cathode surface area required. Expressed in another way, the lower the desired percentage depletion for a given period of time, the less cathode surface area required.

In order to achieve good stirring or circulation of the electrolyte in the cell, the cell is typically operated in conjunction with an adjoining circulation tank between which the electrolyte is cycled. However, such operation is not necessary, i.e., the volume of the cell can be sufficient to electrolyze batchwise the amount of electrolyte generated by the present recovery process in a given period of time.

Following electrodeposition of rhodium contained in the rhodium feed liquor charged to the electrolytic cell, the spent electrolyte, i.e., the spent liquor, is removed from the cell and either recycled or discarded. The electrolytic cell is normally then washed with water to remove all traces of the spent electrolyte. Thereafter, the electrolytic cell is flooded with a dilute solution of hydrofluoric acid. The acid undermines the rhodium electrodeposit and, because the rhodium is not soluble in the hydrofluoric acid, rhodium metal flakes off and falls to the bottom of the electrolytic cell.

The solution of hydrofluoric acid and solid rhodium metal is drained from the electrolytic cell, filtered and the rhodium deposits washed with distilled water. The electrolytic cell is also washed with water and this wash water can be used to wash the rhodium metal retained on the filter. The rhodium metal retained on the filter can be consolidated in a furnace by melting and recovered.

As described, the solution of hydrofluoric acid used to strip rhodium from the electrode is a dilute solution. Typically, an aqueous solution of from about 0.1 to about 5 weight percent hydrofluoric acid, preferably from 0.5 to 5 weight percent hydrofluoric acid is used. While a solution of less than 0.1 weight percent hydrofluoric acid can be used, the rate at which rhodium is removed from the electrode is much slower than at the higher expressed concentrations. Conversely, at concentrations greater than 5 weight percent hydrofluoric acid, the rate at which rhodium is removed from the electrode is relatively faster; but, the amount of cathode dissolved is also significant. Consequently, a compromise between the rate at which rhodium is stripped from the electrode and the amount of cathode dissolved by the acid must be reached. With a titanium cathode, a one weight percent hydrofluoric acid solution has been found adequate to remove the rhodium deposit without dissolving a significant amount of the titanium electrode.

The amount of the dilute hydrofluoric acid solution used should be sufficient to contact all of the working surfaces of the electrode, i.e., the surfaces containing the rhodium deposit. Normally, the cell is flooded with the solution of hydrofluoric acid.

The rhodium plated electrode is left in intimate contact with the stripping acid for a time sufficient for the acid to undermine the rhodium deposit and for the deposit to flake off or be wiped off easily. The contact time will, of course, depend on the concentration of the solution of hydrofluoric acid used. Typically, contact times of from about one minute to about ten minutes have been found suitable. Naturally, the contact time should not be unduly lengthened or extended because the longer the electrode is in contact with the stripping acid solution, the more of the electrode surface that is dissolved.

The rhodium metal recovered from the electrolytic cell may contain small quantities of radioactive isotopes, e.g., ruthenium $^{106}$ and/or rhodium $^{102}$, if the rhodium is obtained from waste streams obtained from processed nuclear fuels. Such radioactivity may restrict somewhat its commercial use. However, preliminary studies supported by the United States Atomic Energy Commission indicate that its use as an ammonia synthesis catalyst would be acceptable. If desired, the rhodium can be dissolved by potassium bisulfate fusion techniques and electrodeposited a second time to further refine and decontaminate the rhodium metal recovered. The aforementioned potassium bisulfate fusion technique is discussed on pages 846–847 of the Kirk-Othmer Encyclopedia of Chemical Technology, Second Edition, Volume 15 (1968).

In a typical embodiment of the present invention, a sulfuric acid solution containing rhodium at a concentration of about 100 milligrams per liter is introduced into an electrolytic cell containing a platinized titanium anode and a titanium cathode and the solution electrolyzed under controlled cathode potential conditions of from −0.2 to about −0.3 volts with reference to a standard silver/silver chloride reference electrode to thereby deposit rhodium on the cathode. The rhodium depleted sulfuric acid solution is removed from the cell and the cell washed with water. After the wash water is removed, a one percent (by weight) aqueous solution of hydrofluoric acid is pumped into the electrolytic cell in quantities sufficient to flood the cell. After about five minutes, the rhodium deposit flakes off from the titanium cathode and falls to the bottom of the cell. The hydrofluoric acid solution is drained from the electrolytic cell through an appropriate filter. The electrolytic cell is again washed with water and the wash water used to wash the rhodium metal retained on the filter. If desired, the hydrofluoric acid solution can be kept separate from the wash water to retain its strength and reused to remove further rhodium deposits. The electrolytic cell is again washed with water and the cell is ready to receive another batch of rhodium feed liquor. The rhodium retained on the filter is passed to a furnace where it is melted and consolidated.

The present process is more particularly described in the following example which is intended as illustrative only since numerous modifications and variations therein will be apparent to those skilled in the art.

EXAMPLE

Sixty milliliters of a 10 percent sulfuric acid solution containing 4.7 milligrams of rhodium were charged to a glass beaker used as a controlled potential electrolytic cell and electrolyzed. The cathode was titanium and the anode was platinum-clad titanium. Both electrodes were about one square inch. The solution was mechanically stirred with a spin bar. The cathode potential was held at −0.25 volts with reference to a silver/silver chloride reference electrode. The electrolysis current was about 40 milliamperes. After four hours, the electrolysis was discontinued and the electrodes were lifted from the cell. The rhodium metal adhering to the cathode was removed by dipping the cathode into a small beaker containing an aqueous solution of one weight percent hydrofluoric acid. The deposited rhodium fell from the cathode and the cathode was removed from the hydrofluoric acid solution. The solid rhodium was collected by filtration of the hydrofluoric acid solution through a millipore filter and rinsed with distilled water. The collected solids were then dissolved in fused potassium hydrogen sulfate. The fusion mixture was cooled and dissolved in water. Upon analysis, the water solution was found to contain 4.6 milligrams of rhodium.

The above example demonstrates the self-contained method for recovering electrolytic deposits of rhodium from a cathode.

Although the present process has been described with reference to specific details of certain embodiments thereof, it is not intended that such details be regarded as limitations upon the scope of the invention, except as and to the extent they are included in the accompanying claims.

I claim:

1. A method for removing electrodeposits of rhodium from the surface of an electrode, said surface being dissolvable by hydrofluoric acid, which comprises contacting such deposits with a dilute solution of hydrofluoric acid for a time sufficient for the hydrofluoric acid to undermine the deposit and recovering rhodium removed from the electrode.

2. The method of claim 1 wherein the acid solution contains from about 0.1 to about 5 weight percent hydrofluoric acid.

3. The method of claim 1 wherein the solution of hydrofluoric acid is in contact with the electrode for from about one to about ten minutes.

4. The method of claim 1 wherein the electrode is titanium, tantalum, zirconium, hafnium, or titanium-clad copper.

5. The method of claim 1 wherein the rhodium is produced from irradiation of nuclear fuels.

6. A method for recovering rhodium from acidic rhodium-containing liquids, which comprises electrolyzing the liquid in an electrolytic cell having an anode and a cathode, the surface of the cathode being dissolvable by hydrofluoric acid, and thereby depositing rhodium on the cathode, contacting the cathode with a dilute solution of hydrofluoric acid for a time sufficient to undermine the rhodium deposit and recovering rhodium removed from the cathode.

7. The method of claim 6 wherein the acid solution contains from about 0.1 to about 5 weight percent hydrofluoric acid.

8. The method of claim 6 wherein the solution of hydrofluoric acid is in contact with the electrode for from about one to about ten minutes.

9. The method of claim 6 wherein the cathode is titanium, tantalum, zirconium, hafnium, or titanium-clad copper.

10. The method of claim 6 wherein the electrode is in contact with the hydrofluoric acid for a time sufficient to cause rhodium deposit to flake off the electrode.

11. The method of claim 6 wherein the electrolysis is conducted at controlled cathode potential conditions and at a potential of from about −0.2 to about −0.3 volts with reference to a standard silver/silver chloride reference electrode.

12. The method of claim 6 wherein the rhodium is produced from irradiation of nuclear fuels.

13. The method of claim 12 wherein the rhodium liquid is produced from processing or irradiated nuclear fuels.

* * * * *